Patented July 16, 1935

2,008,457

UNITED STATES PATENT OFFICE 2,008,457

PROCESS FOR OBTAINING THREE COLOR FILMS

Paul Emmanuel François Lessertisseux, Paris, France

No Drawing. Application May 25, 1934, Serial No. 727,581. In France June 1, 1933

4 Claims. (Cl. 95—2)

The invention relates to the preparation of colored films based on the general principle of color photography by the three color process.

The process will be used specially for making colored films for cinematographic projection, but it is also suitable for making separate colored photographs for projection or any other use.

The invention consists only in a new method of reproducing the natural colors of the subject from three monochrome negatives obtained with any appropriate camera of a known system. Cameras used for three color photography take three images of the subject: the first one, taken through a blue violet screen, gives the negative which is to be reproduced in positive as yellow; the second one, taken through a green screen, gives the negative to be reproduced in positive as red; and the third one, taken through a red-orange screen, gives the negative to be reproduced in positive as blue.

The three colored positive images, yellow, red and blue, shall be exactly superimposed on a single film for giving a correct colored image. The apparatus and methods of registration permitting this superimposition in a more or less automatic manner, do not form part of the present invention which concerns only a process for producing the three colored images on the same film.

According to the invention, the process makes use of a film covered on both sides with a layer of silver gelatino-bromide. The two faces of this film are successively or simultaneously exposed behind two of the three monochrome negatives, the images being exactly registered; they are then simultaneously developed and fixed. Two black silver images exactly superimposed are thus obtained, corresponding to two colors of the three color process.

The two black images are then colored in their respective colors by the well known process of mordanting.

The third color is now to be added on the film. For this purpose, a separate positive film is made, corresponding to the third monochrome negative; this positive film will be used to print the third color on the film carrying already two colored images. It is to be remarked here that this auxiliary positive film may be used for the production of any number of three color films.

The film carrying already two colored images is sensitized in an alkaline bichromate bath and dried. It is then exposed behind the positive film corresponding to the third color, which is referred to above. Care is taken to obtain an exact superimposition on the images already obtained.

After exposure, the gelatin of the exposed side has become insoluble at all places corresponding to the clear parts of the positive film, and it is more or less soluble at all places corresponding to the dark parts of the positive film.

After washing, the third color is laid on the film; it is more or less absorbed, according to the solubility of the gelatin, and the third image appears.

The above description gives the general method used, but the invention relates more particularly to the technical details for obtaining the result, because it has been recognized by experiment that the process as described can only give good results with a very small number of selected coloring matters and only when the sequence of the coloring process is judiciously determined.

The invention moreover relates to certain methods for applying colors which can be used in industrial production.

In fact, the following difficulties occur when an attempt is made to use the above described process:

1st. The mordanting processes generally known make use of basic dyes whereas the processes based on the properties of bichromated gelatin (hydrotype or pinatype) require certain acid dyes having the property of penetrating only into the nonexposed parts of the gelatin. Thus the basic and acid dyes react generally upon one another and yield an insoluble dye of intermediate shade.

2nd. The fixing of a basic dye on the chemical used as a mordanting agent produces also an insoluble dye. When an acid dye is next applied, the insoluble dye prevents this acid dye from penetrating into the parts bearing already the basic dye. The result is that the superimposed colored image cannot be completely printed.

3rd. Certain basic dyes do not withstand the immersion in the alkaline bichromate bath; they dissolve or their shade is changed.

It has been found that the process can however be used and the above drawbacks can be avoided by selecting certain dyes and by operating in a definite sequence, as described hereafter.

One of the exposed sides of the films receives first the blue image which is obtained by means of a basic dye which will not have any subsequent action during the preparation of the image by the bichromate process.

It has been found that Capri blue (tetramethylbenzotoluoxazine chlorhydrate) and 5-B Rhoduline blue made by the Farbwerke of Hochst-onthe-Main, Germany (chemical name not known) are suitable for this purpose.

The image which will be superimposed on the same side as the blue image may be the yellow image or the red one.

For the yellow image, the following coloring matters may be used: F yellow made by the Farbwerke, of Hochst-on-the-Main, Germany (xylidine sulfone diazote on methylphenylpyrazolone) or Mikado golden yellow, made by the same firm (dinitrostilbenedisulfonate of sodium) or Thiazol yellow, made by the same firm (sodium diazomidodehydrothiotoluidinesulfonate).

For the red image, the following dyes may be used: ordinary carmine in alkaline solution or R pinatypic red made by the Farbwerke of Hochst-on-the-Main, Germany (chemical name not known).

The other side of the film, which does not receive a superimposed image, will then be colored in yellow or red depending on whether the red or yellow image respectively has been chosen for superimposition on the first side.

The following dyes may be chosen: for the yellow: thioflavine T (dimethyldehydrothioparatoluidine chloromethylate) or Acridine yellow (diamidodimethylacridine chlorhydrate). For the red: S Rhodamine (tetramethylmetamidophenolsuccineine chlorhydrate).

The above dyes have been practically used in the research relating to the invention, but other coloring matters having similar properties can eventually be found without departing from the present invention which covers specifically the successive application of two dyes having no reaction either upon one another or on the mordanting agent, and which can be dipped in a bichromate bath under the conditions described.

The present invention covers also a method for applying in an industrial manner the coloring agents, in order to obtain a simultaneous or successive but independent dyeing of two sides of the same film.

For this purpose, the dyeing solutions either of basic or acid dyes are thickened with a convenient matter, such as glycerine or mono-acetine. Other thickening agents can be found without departing from the present invention. These thickening agents allow the coloring solutions to be spread in a thin layer on the surface of the film by means of an appropriate device, such as a roller operating in the same way as the inking roller of a printing machine. The thick coloring solution cannot reach the opposite side. It has moreover been found that the above thickening agents increase the penetration of the dye into the gelatin layer and facilitate the washing of the film for removing the excess of dyeing solution.

I claim,

1. A process for the production of cinematographic or photographic films in more than one color from component monochrome negatives each taken through an appropriate color screen, consisting in exposing a film coated with a gelatino-silver bromide emulsion under one monochrome negative, developing and fixing the silver image, coloring it blue by a basic dye taken from a group comprising Capri blue G. O. N. and Rhoduline blue 5 B, neither of these dyes having any subsequent action on the formation of an image by the bichromate process, resensitizing the film with bichromate, reexposing under another monochrome negative and dyeing with a pinatype dye.

2. A process for the production of three color cinematographic or photographic films from three component monochrome negatives each taken through an appropriate color screen, consisting in forming a blue image on one face of the film by coloring a black silver image by a basic dye taken from a group comprising Capri blue G. O. N. and Rhoduline blue 5 B, neither of these dyes having any subsequent action on the formation of an image by the bichromate process, forming a yellow image on the other face of the film by coloring a black silver image by a dye taken from a group comprising Thioflavine T and Acridine yellow and printing a red image over the blue image by resensitizing with bichromate, reexposing and dyeing with a pinatype dye taken from a group comprising ordinary carmine in alkaline solution and Pinatype red.

3. A process for the production of three color cinematographic or photographic films from three component monochrome negatives each taken through an appropriate color screen, consisting in forming a blue image on one face of the film by coloring a black silver image by a basic dye taken from a group comprising Capri blue G. O. N. and Rhoduline blue 5 B, neither of these dyes having any subsequent action on the formation of an image by the bichromate process, forming a red image on the other face of the film by coloring a black silver image by Rhodamine S and printing a yellow image over the blue image by resensitizing with bichromate, reexposing and dyeing with a pinatype dye taken from a group comprising Pina yellow F, Mikado golden yellow and Thiazol yellow.

4. A process as claimed in claim 1, in which the dye solution used for coloring the black silver image is thickened by mixing it with a thickening agent and then applied to the surface of the film in a thin layer.

PAUL EMMANUEL
FRANÇOIS LESSERTISSEUX.